United States Patent [19]

Luoma, II et al.

[11] Patent Number: 4,640,776
[45] Date of Patent: Feb. 3, 1987

[54] PLASMAPHERESIS FILTRATION MODULE HAVING PRESSURE BALANCING AND SEALING MEANS

[75] Inventors: Robert P. Luoma, II, Newark, Del.; Frank M. Willis, Wenonah, N.J.

[73] Assignee: E. I. Du Pont de Nemours and Company, Wilmington, Del.

[21] Appl. No.: 349,368

[22] Filed: Feb. 16, 1982

[51] Int. Cl.⁴ .............................................. B01D 13/00
[52] U.S. Cl. .................................. 210/433.2; 210/456
[58] Field of Search ............... 210/247, 321, 433, 445, 210/456, 927

[56] References Cited

U.S. PATENT DOCUMENTS

| | | | |
|---|---|---|---|
| 3,211,645 | 10/1965 | Ferrari | 210/637 |
| 3,212,642 | 10/1965 | Kylstra | 210/321 |
| 3,354,618 | 11/1967 | Dounoucos | 55/158 |
| 3,429,757 | 2/1969 | Nash | 156/70 |
| 3,541,005 | 11/1970 | Strathmann et al. | 210/636 |
| 3,684,097 | 8/1972 | Mathewson, Jr. et al. | 210/321 |
| 3,705,100 | 12/1972 | Blatt et al. | 210/927 |
| 3,966,616 | 6/1976 | Bray | 210/433.2 |
| 4,001,117 | 1/1977 | Trechsel | 210/180 |
| 4,075,091 | 2/1978 | Bellhouse | 210/637 |
| 4,191,182 | 3/1980 | Popovich et al. | 128/214 R |
| 4,212,742 | 7/1980 | Solomon et al. | 210/247 |

FOREIGN PATENT DOCUMENTS

| | | | |
|---|---|---|---|
| 2653875 | 6/1978 | Fed. Rep. of Germany | 210/433.2 |
| 2925143 | 1/1981 | Fed. Rep. of Germany | 210/433.2 |
| 167009 | 12/1980 | Japan | 210/416.1 |
| 01043 | 5/1980 | PCT Int'l Appl. | 210/321.2 |
| 1555389 | 11/1979 | United Kingdom | 210/433.2 |
| 2037614A | 7/1980 | United Kingdom | 210/433.2 |
| 2048114A | 12/1980 | United Kingdom | 210/321.2 |

OTHER PUBLICATIONS

Dorson et al., Chem. Eng. Prog. Symp. Ser. 64, 1968, pp. 85–89.
Driscoll et al., Trans. Amer. Soc. Artif. Int. Organs XXIII, 1977, pp. 470–478.
Bixler et al., Trans. Amer. Soc. Artif. Int. Organs XIV, 1968, pp. 99–108.

Primary Examiner—David Sadowski

[57] ABSTRACT

A plasmapheresis filtration module having stacked grooved plates interleaved with membranes, enclosed in a unitary, flexible, impermeable envelope, sealing being effected by pressing the membranes between blood flow channels and a sealing surface on a plasma side support.

5 Claims, 10 Drawing Figures

PLASMAPHERESIS FILTRATION MODULE HAVING PRESSURE BALANCING AND SEALING MEANS

FIELD OF THE INVENTION

This invention relates to plasmapheresis by filtration and, more particularly, to apparatus for plasmapheresis by membrane filtration.

BACKGROUND INFORMATION

Plasmapheresis is a process of separating plasma from whole blood. The plasma-depleted blood is comprised principally of cellular components, e.g., red blood cells, white blood cells and platelets. Plasma is comprised largely of water, but also contains proteins and various other noncellular compounds, both organic and inorganic.

Continuous plasmapheresis is the process of continuously removing whole blood from a subject, separating plasma from the blood and returning the plasma-depleted blood to the subject in a continuous extracorporeal circuit.

Plasmapheresis is currently used to obtain plasma for various transfusion needs, e.g., preparation of fresh-frozen plasma, for subsequent fractionation to obtain specific proteins such as serum albumin, to produce cell culture media, and for disease therapies involving either the replacement of plasma or removal of specific disease-contributing factors from the plasma.

Plasmapheresis can be carried out by centrifugation or by filtration. Generally, in known filtration apparatus, whole blood is conducted in a laminar flow path across one surface, i.e., the blood side surface, of a microporous membrane with a positive transmembrane pressure difference. Useful microporous membranes have pores which substantially retain the cellular components of blood but allow plasma to pass through. Such pores are referred to herein as cell-retaining pores. Typically, cell-retaining pore diameters are 0.1 $\mu$m to 1.0 $\mu$m.

Various filtration devices for plasmapheresis are disclosed in the literature. U.S. Pat. No. 3,705,100 discloses a center-fed circular membrane having a spiral flow path. U.S. Pat. No. 4,212,742 discloses a device having divergent flow channels. German Patent No. 2,925,143 discloses a filtration apparatus having parallel blood flow paths on one side of a membrane and parallel plasma flow paths, which are perpendicular to the blood flow paths, on the opposite surface of the membrane. U.K. Patent Application No. 2,037,614 discloses a rectilinear double-membrane envelope in which the membranes are sealed together at the ends of the blood flow path. U.K. Patent Specification No. 1,555,389 discloses a circular, center-fed, double-membrane envelope in which the membranes are sealed around their peripheries. German Patent No. 2,653,875 discloses a circular, center-fed double-membrane device in which blood flows through slot-shaped filter chambers.

It is an object of this invention to provide a plasmapheresis filtration module which, if desired, can be used for plasmapheresis by reciprocatory pulsatile filtration. It is a further object to provide such a module which is easy-to-assemble and sterilizable and characterized by rigid flow paths and sealing of membranes without gaskets or adhesives.

DISCLOSURE OF THE INVENTION

For further comprehension of the invention and of the objects and advantages thereof, reference may be had to the following description and to the appended claims in which the various novel features of the invention are more particularly set forth.

The invention resides in an improved plasmapheresis filtration module having a planar membrane between a blood side support and a plasma side support, the blood side support having a blood flow path extending radially from a central inlet, wherein the improvement comprises blood pressure balancing and sealing grooves around the blood flow path on the blood side support. It has been found that such grooves enhance uniform distribution of pressure and flow within the module and thereby improve plasma depletion.

In the description and examples of the invention which follow, the term "forward" is used to indicate a direction generally away from the source of blood; "reverse" indicates a direction generally towards the source of blood. Transmembrane pressure difference is determined by subtracting the pressure on the plasma side, i.e., the second surface of the membrane, from the pressure on the blood side, i.e., the first surface of the membrane. "Cell-retaining pores" means pores which substantially retain cellular components but allow plasma to pass through the membrane.

Plasmapheresis by filtration is enhanced by the use of fouling-reducing techniques, e.g., pulsatile flow, reciprocatory pulsatile flow and high blood flow rate via recirculation. Plasmapheresis using reciprocatory pulsatile flow, which is the invention of one other than the inventor herein, comprises the steps of:

(1) conducting blood in a forward direction over a first surface, i.e., a blood side surface, of each of one or more membranes having cell-retaining pores;

(2) terminating the forward conducting of blood over the first surface of each membrane;

(3) conducting the blood in the reverse direction over said first surface, the volume of blood flowed in the reverse direction being less than the volume of blood flowed in the forward direction in step (1);

(4) repeating steps (1)-(3) in sequence and collecting plasma which passes through each membrane from a second surface, i.e., a plasma side surface, thereof and collecting plasma-depleted blood from said first surface.

Other steps may also be included, e.g., recycling the plasma-depleted blood, treating plasma during filtration, diluting the blood with a compatible fluid and measuring various biologically significant factors.

From the location at which the blood first contacts the membrane, which may or may not be near a point on an edge or end of the membrane, blood is conducted in a forward direction in one or more flow paths. A flow path is the space through which the blood flows on the first surface of the membrane. Typically the depth of blood in each flow path is less than about 30 mils (0.76 mm).

Plasma is driven through the cell-retaining pores in the membrane by a positive transmembrane pressure difference. Typically, positive transmembrane pressure difference is generated primarily by resistance to forward blood flow, but it can also be generated in other ways, e.g., by decreasing pressure on the plasma on the second surface.

The amount of transmembrane pressure difference that can be withstood by blood without hemolysis is largely a function of cell-retaining pore size which is, typically, 0.1 to 1.0 $\mu$m, diameter. For most purposes, the preferred pore diameter is about 0.4 to 0.6 $\mu$m. In this range, a positive transmembrane pressure difference of no more than about 4 psi (28 kPA) is desirable. When the pore diameter is smaller or larger, higher or lower transmembrane pressure differences, respectively, are acceptable, although it is preferred that the transmembrane pressure difference be kept low, e.g., below about 1.5 psi (10 kPa).

After the forward conducting of blood, the blood is conducted in the reverse direction in each flow path. The frequency and volume of the reciprocatory pulses are selected to maximize the flow of plasma through the membrane without causing extensive blood trauma. In a blood flow path having a height of about 4 to 10 mils (102 to 254 $\mu$m), a useful frequency and volume are about 20 to 140 pulsations per minute and 0.5 to 4 mL per pulsation, preferably about 3 mL. Said parameters should be selected to provide a mean linear velocity up to about 400 mm-sec$^{-1}$, preferably up to about 250 mm-sec$^{-1}$. The net volume of blood flowed in the reverse direction is less than the net volume of blood flowed forward.

The blood which approaches the ends of each flow path is plasma-depleted blood. It is collected and conducted away from the module by any suitable means, as is the plasma which flows through the membrane.

Any type of useful planar membrane(s) in any suitable shape, configuration or arrangement can be used. Similarly, any suitable means can be used to conduct blood to the membrane and plasma-depleted blood and plasma from the membrane.

Figure 1:
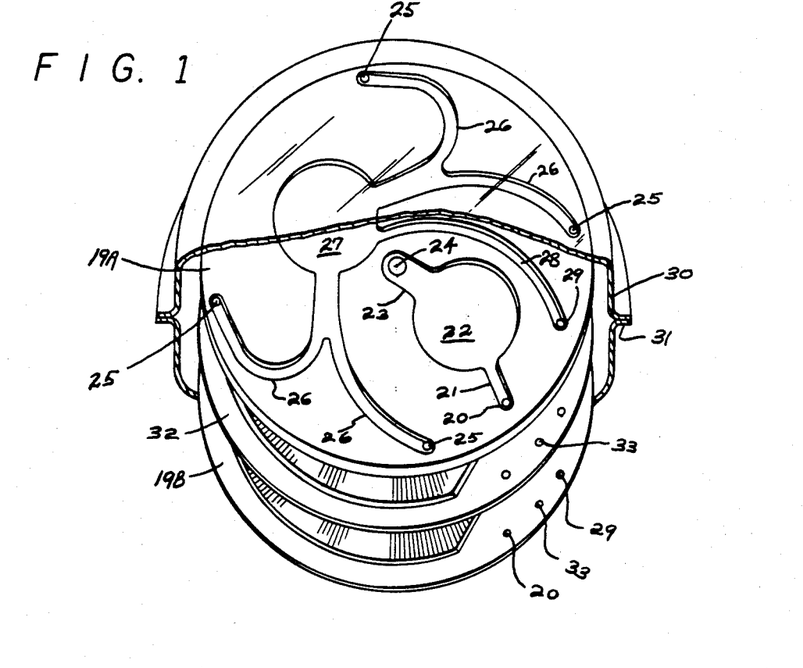
FIG. 1 is an exploded view of the preferred module of the invention.

Referring now to the drawings, which are illustrative only, FIGS. 1 to 7 illustrate modules having an end plate which has reciprocatory pulse cavities integral therewith and which is the invention of a different inventive entity. Referring to FIG. 1, which illustrates a partially exploded view of the module, the module comprises a clampable stack of plates 19A, 19B, 32 between which, suitable membranes, not shown, are interleaved. The plates are flexible and require external structural suppport, such as is described below with reference to FIGS. 5 and 6, to effect sealing and to compensate for compliance and tolerance within the module. Blood is conducted into the module via module inlet 20 in end plate 19B and is conducted through matched ports in plates 32, 19A. End plate 19A is about 0.19 inch (4.8 mm) thick; end plate 19B and plate 32 are about 0.08 inch (2.0 mm) thick; the module is about 8 inches (0.2 m) in diameter.

From module inlet 20 in end plate 19A, the blood is conducted through shallow channel 21, 0.2 inch (5.1 mm) wide × 0.06 inch (1.5 mm) deep, into inlet reciprocatory pulse cavity 22 which has a volume of about 3 mL and is about 2 inches (50.8 mm) in diameter × 0.06 inch (1.5 mm) deep. Cavity 22 is employed in the generation of reciprocatory pulsations as described below. From cavity 22, the blood is conducted through shallow channel 23, 0.5 inch (127 mm) wide × 0.13 inch (3.3 mm) deep, to blood flow path inlet 24 which is about 0.38 inch (9.7 mm) in diameter, i.e., cavity 22 is between module inlet 20 and blood flow path inlet 24. The blood is conducted through port 24, and through a matched port in plate 32 and in the membranes, to blood flow paths lying between each membrane and one surface of a plate; e.g., on a membrane lying between end plate 19A and adjacent plate 32, the blood flow path is between the membrane and the interior surface of end plate 19A, which is a blood side support, as illustrated for plate 32 in FIG. 2. The blood in the blood flow path conducted radially to plasma-depleted blood collection channels and from there, through matched flow path outlets 25 and through branch channels 26 to outlet reciprocatory pulse cavity 27 in end plate 19A. The branch channels from the four outlets 25, which are equidistant from each other, begin as four channels each about 0.250 inch (6.4 mm) wide × 0.060 inch (1.5 mm) deep and merge into two channels each about 0.500 inch (12.7 mm) wide × 0.060 inch (1.5 mm) deep. The branch channels are of equal length and cross-section so as to produce substantially equal pressure conditions during use. Cavity 27 is also employed in the generation of reciprocatory pulsations as described below. From cavity 27, the plasma-depleted blood is conducted through shallow channel 28, 0.200 inch (5.1 mm) wide × 0.060 inch (1.5 mm) deep, and through module plasma-depleted blood outlet 29 which extends through matched ports in plates 32, 19B, i.e., cavity 27 is between blood flow path outlets 25 and module plasma-depleted blood outlet 29.

Figure 3:
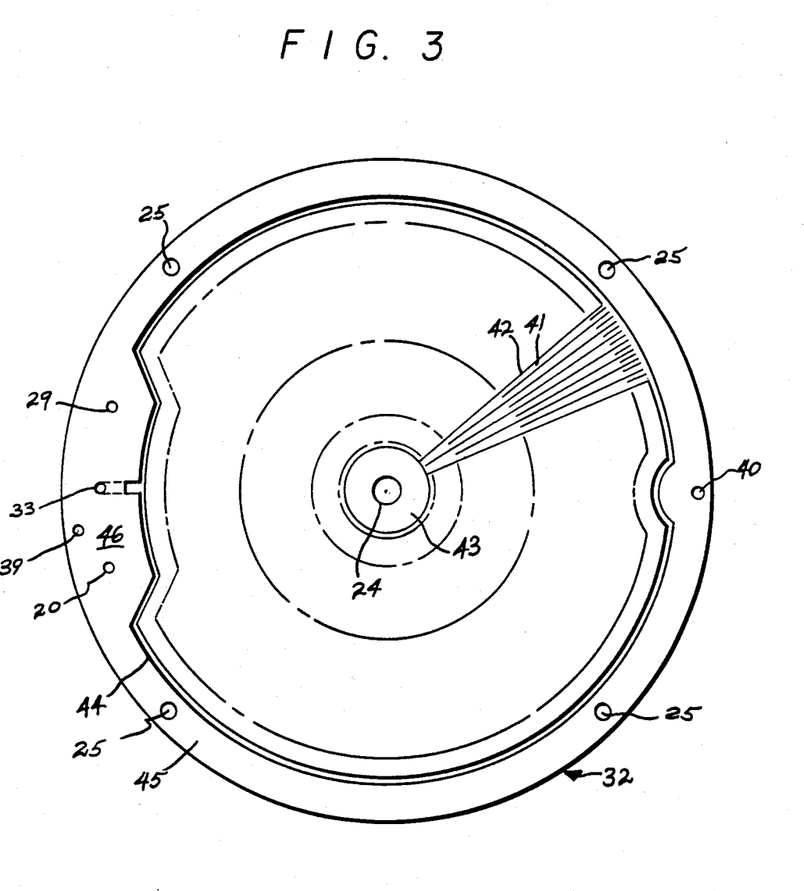
FIG. 3 is a plan view of a plasma side support of the module of FIG. 1.

Plasma which passes through the membranes flows radially in a plasma flow path, e.g., on the membrane which lies between end plate 19A and adjacent plate 32, the plasma flow path is between the membrane and plate 32. The plasma flow path is comprised of radial flow channels which culminate in a perimeter plasma collection channel, as illustrated by FIG. 3, from which the plasma passes through matched ports 33 in plates 32, 19B and out of the module. A section of plasma flow channels are also illustrated in FIG. 1.

Figure 5:
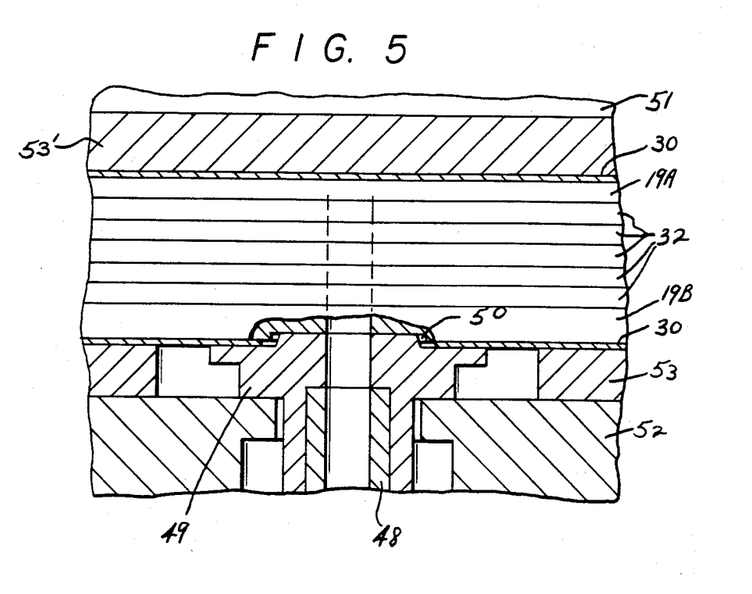
FIG. 5 is an elevational view in cross-section of the attachment of an inlet or outlet tube to the module of FIG. 1.

The entire module is enclosed by envelope 30, which is cut away for purposes of illustration. It is comprised of two sheets of a flexible blood-impermeable material, such as poly (vinyl chloride), the sheets being joined together at seal 31 around the perimeter of the stack. The envelope thus provides a unitary flexible enclosure for the module which retains the plates and membranes in proper relationship. The three apertures 20, 29, 33 in end plate 19B mate with tube connections in envelope 30 as illustrated in FIG. 5.

Figure 7:
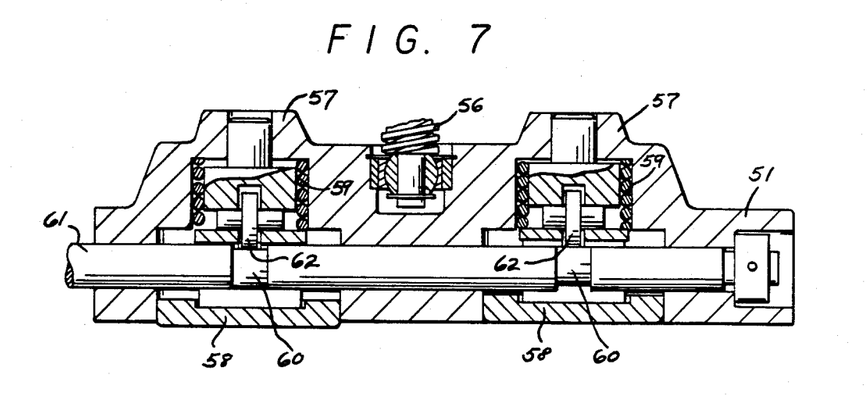
FIG. 7 is an elevational view in cross-section of reciprocating plungers used with the module of FIG. 1.

Envelope 30 covers and seals the various channels, cavities and apertures in end plate 19A and forms a flexible diaphragm over each cavity 22, 27. A perimeter lip, not shown, around each cavity and channel in end plate 19A aids in sealing. Reciprocatory pulsations are generated by alternately compressing the diaphragm over each of cavities 22, 27. Reciprocating plungers which are useful for this purpose are illustrated by FIG. 7.

Figure 2:
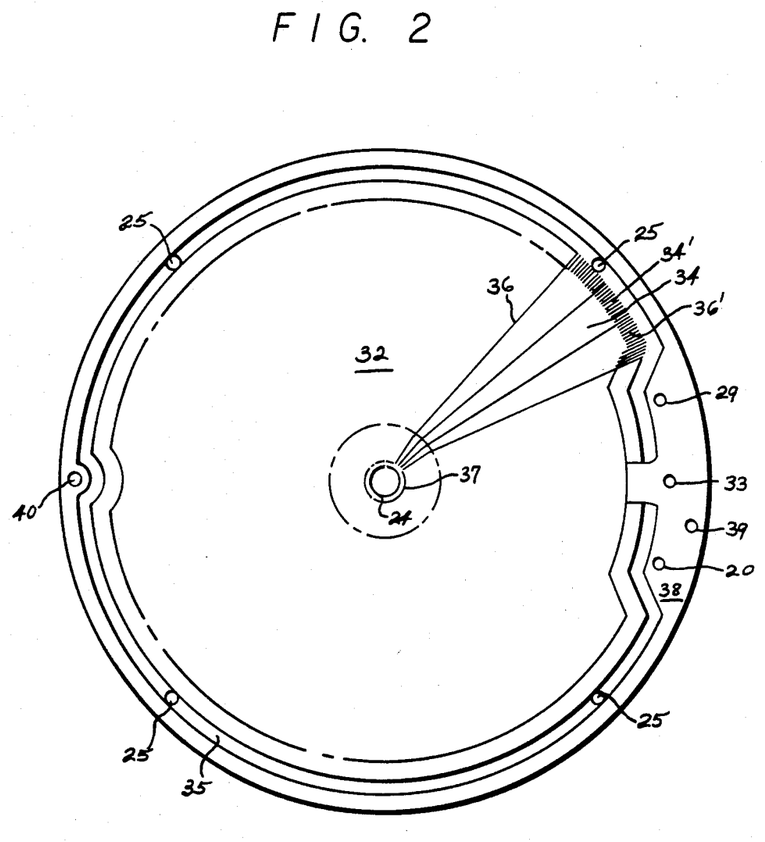
FIG. 2 is a plan view of a blood side support of the module of FIG. 1.

FIG. 2 illustrates a blood side support comprised of plate 32, a surface of which is provided with recessed radial blood flow channels 34. Between channels 34 are ridges 36. The channels 34 extend from counterbore 37 around inlet 24. For purposes of illustration, only a portion of enlarged blood flow channels are shown. In fact, ninety channels 34 extend around the entire perimeter of inlet 24 although more or fewer channels may be employed. The channels 34 are at least about 4 mils (0.1 mm) deep, preferably about 4 to 10 mils (0.1 to 0.3 mm). They are narrow around the inlet and increase in width from about 8 mils (0.2 mm) to about 250 mils (6.4 mm). The counterbore is about 20 mils (0.5 mm) deep and 0.5 inch (12.7 mm) in diameter. Around the perimeter of flow channels 34 is perimeter plasma-depleted blood collection channel 35 which leads to plasma-depleted blood outlet ports 25. Between flow channels 34 and collection channel 35 are blood pressure balancing and sealing grooves comprising a perimeter border of short narrow channels 34', each about 4 to 30 mils (0.1 to 0.8 mm) wide. Between perimeter channels 34' are ridges 36'. Perimeter channels 34' enhance uniform distribution of pressure and flow within the blood flow channels by causing increased velocity and hence increased pressure drop across the perimeter channels.

In region 38, the channels are spaced inward from the edge of the plate so as to avoid intersecting any of ports 20, 33, 29. The channels 34 are offset from radial plasma flow channels on a plasma side support so that the ridges between the blood flow channels and the ridges between the plasma flow channels will not be contiguous but rather will intersect, thus minimizing the risk of membrane shearing; in the illustrated embodiment, approximately the outer 80% of the axes of flow channels 34 are angled slightly from a pure radial direction. Also to minimize the risk of shearing, the ridges between the channels preferably have flat surfaces, e.g., about 3 to 10 mils (0.1 to 0.3 mm) wide.

Alignment pins 39 and 40 fit snugly into aligned holes in each plate 19A, 19B, 32 thus maintaining the plates in the proper relative orientation.

The preferred plasma side support, opposite the blood side support, is illustrated by FIG. 3. The plasma side support comprises the other surface of plate 32, having plasma flow channels 41 recessed in one surface thereof with ridges 42 therebetween. The plasma flow channels 41 extend from an inlet sealing surface 43 in zones of progressively greater numbers to a perimeter plasma collection channel 44, which is about 0.07 inch (1.8 mm) wide × 0.030 inch (0.8 mm) deep. For purposes of illustration, only a section of enlarged plasma flow channels are shown in the Figure. By progressively increasing the numbers of plasma flow channels, closely-spaced ridges, which provide support for the membrane, are maintained. In the illustrated plasma side support, the number of plasma flow channels doubles in each succeeding zone so that in the innermost zone there are 90 such channels and in the outermost zone there are 1440 such channels.

In the center of plate 32 is blood flow path inlet 24, e.g., about 0.39 inch (9.9 mm) in diameter, which is in registry with blood flow path inlet 24 in plate 19A.

Inlet sealing surface 43 is an area on the plasma side support which is coplanar with the nonrecessed areas of the support. It is opposite narrow blood flow channels on an opposing blood side support so that when the supports are pressed together with a membrane therebetween, blood is substantially prevented from leaking into plasma flow regions without the use of adhesives or gaskets. Surface 43 is a circular area, concentric with inlet 24 and of larger diameter, e.g., about 1 inch (25.4 mm). Preferably, it is an inlet sealing boss although other elements can be used, e.g., an annular insert. It substantially prevents blood from leaking from inlet 24 to plasma flow channels 41. The plasma collection channel 44 is located within a smaller radius than the short, narrow channels 34' on plate 19A. Between the plasma collection channel 44 and the edge of plate 32 is a perimeter sealing surface 45 which can be pressed against channels 34', there being a membrane therebetween, effecting a seal in a manner similar to the seal around inlet 24.

From the plasma collection channel 44, plasma flows to plasma outlet 33. As with the blood side support, the channels are spaced inward from the edge of the plate in region 46.

The interior surface of plate 19A in FIG. 1 also comprises a blood side support identical to that shown in FIG. 2. Several plates 32 can be stacked to permit use of a desired number of membranes, the preferred number being four to six. The last plate, i.e., end plate 19B, comprises a plasma side support, on its interior surface, which is identical to the plasma side support illustrated in FIG. 3 except that end plate 19B is not apertured with blood flow path inlet 24. On its exterior surface, end plate 19B is plain.

Figure 4:
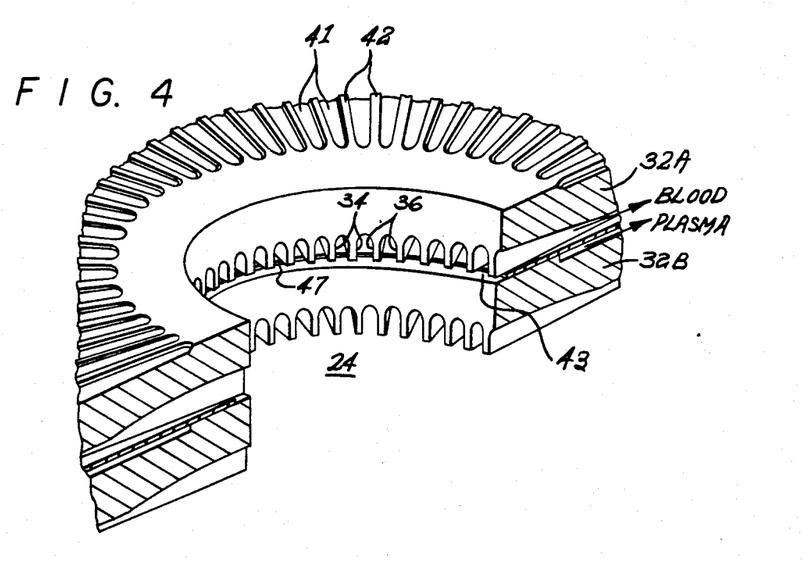
FIG. 4 is a cross-sectional view of a central sealing region in the module of FIG. 1.

FIG. 4 illustrates the central sealing design of the module and the preferred blood flow path entrance design. The membrane 47 is pressed between the blood side support surface of one plate 32A and the plasma side support surface of a second plate 32B. In this figure, there is no counterbore around the inlet on the blood side support as there is in FIG. 2. Membrane 47 bridges the narrow blood flow channels around inlet 24 and is squeezed against central sealing boss 43 of the next plate, acting in this region as seal members in a manner similar to a check valve. By employing channels which are about 4 to 20 mils (0.1 to 0.5 mm), preferably 6 to 10 mils (0.2 to 0.3 mm), in width, under usual operating conditions, i.e., pressures up to about 3 psi (21 kPa), the membrane seal has been found to substantially prevent leakage of blood even when reciprocatory pulsatility is employed, when the module is pressed between clamp jaws.

As can be seen in FIG. 4, the entrance to each blood flow channel is initially deep but uniformly decreases in depth, as the flow channels widen, such that the cross-sectional area of each is substantially maintained while the depth is decreased. This design enhances uniform flow in the module and allows the flow conditions in the thin channels to be attained more gradually than if the entrances to the channels were also thin. The initial depth is greater than about 10 mils (0.3 mm), preferably about 15 to 20 mils (0.4 to 0.5 mm) and is gradually decreased to about 4 to 10 mils (0.1 to 3 mm).

Envelope 30 allows the module to be purged of air and filled with a liquid, e.g., saline, prior to use. When the module is used, this saline solution is swept out of the flow channels by blood and plasma but remains around the periphery of envelope 30 in the region of seal 31. Any blood which may leak into this solution in this region remains there by a check-valve action, due to the seal between perimeter channels 34' and the perimeter sealing boss 45, illustrated in FIGS. 2 and 3, similar to that described for the sealing region surrounding inlet 24 in FIG. 4.

As shown in FIG. 5, tube 48 connections to the apertures 20, 33, 29 are made by joining flanged plastic fittings 49 to the plastic envelope 30 on the bottom of the unit as seen in FIG. 1. No direct connection is made to any of the plates 19B, 19A, 32; however, the fittings are urged against the envelope 30 and into shallow counterbores 50 in end plate 19B by means of a clamping mechanism, namely, jaws 51, 52. Counterbores 50 prevent the plates from moving relative to the envelope during use. Jaws 51, 52, faced with elastomer 53, 53', engage envelope 30 at the top of plate 19A and the bottom of plate 19B and, in addition to holding the tube fittings, urge the stacked plates together in leak-tight condition resisting the hydrostatic pressure of the blood being pumped through the module. Unit pressures within the module are in the order of 0.5 to 3 psi (3.4 to 20.7 kPa) on an area of 40 sq. in. (250 sq. mm) resulting in clamp loadings of up to about 120 lb. (54.4 × 10³ gm). The clamp must provide sufficient external pressure to offset this internal pressure as well as to compensate for compliance and manufacturing tolerances. This external pressure should be evenly distributed.

Figure 6:
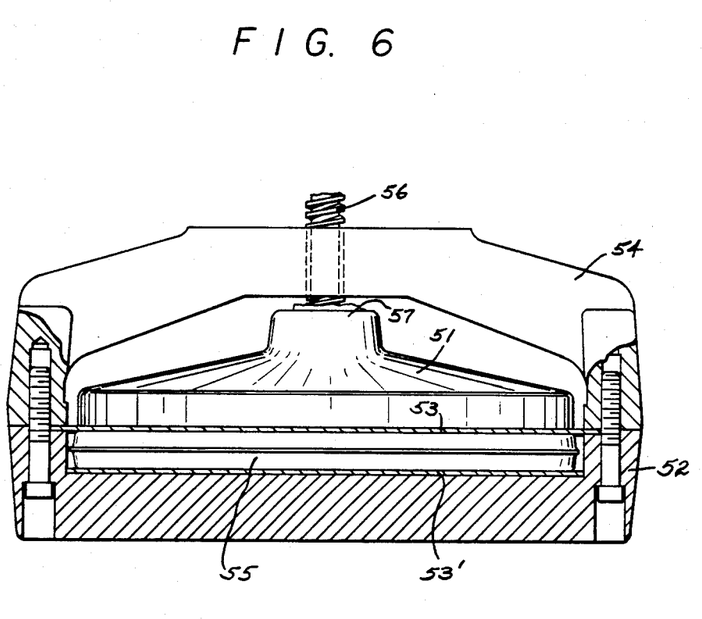
FIG. 6 is a cross-sectional view of a module of the invention pressed between clamp jaws.

Referring to FIG. 6, jaw 52 is a rectangular platen having yoke 54 bolted thereto. Yoke 54 has four legs, two shown; the number of legs is not critical. Jaw 51 is a floating and self-aligning circular platen of larger diameter than module 55 which is pressed against module 55 by means of central gear-reduced screw 56 extending through yoke 54 and connected to jaw 51 by means of a swivel joint, not shown. A gear reducing mechanism, not shown, is fitted to the top of yoke 54. Two bosses 57, shown cut off, are on either side of screw 56 and house reciprocating plungers, as further described below with reference to FIG. 7. Elastomer 53, 53' lie between jaws 51, 52 and module 55. A guide pin, not shown, extending through yoke 54 to jaw 51 is used to properly align jaw 51 with module 55 upon clamping. It has been found that use of such a clamping mechanism provides nearly uniform pressure across the module and provides structural support external to the module, thereby lowering the cost of the module which is a disposable unit.

FIG. 7 illustrates the reciprocating plungers of a pulse generator integral with jaw 51. It is a cross section taken perpendicular to the cross section of FIG. 6. Jaw 51 has bosses 57 for two parallel bores occupied by plungers 58 which are shouldered to carry springs 59 which urge the plungers toward reciprocatory pulse cavities. The plungers are lifted 180° out of phase with each other by means of eccentrics 60 on a common shaft 61 which is carried in bearings, not shown, and is extended outside the bar for a belt connection to a motor drive, not shown, which is mounted on brackets, not shown, extending from jaw 51. The eccentrics 60 each engage a roller 62 in a slot in each plunger 58. Each roller 62 is carried on a wrist pin in the plungers. The throw of the eccentrics is about 0.030 inch (0.8 mm) producing a plunger stroke of about 0.060 inch (1.6 mm). The eccentric shaft drives the pistons down away from the diaphragm compressing the springs and storing energy. The pistons are returned by the springs which limit the maximum force and resulting pressure which can be generated by the piston on the diaphragm over each cavity. This also limits jamming damage should the unit be installed misaligned or with a foreign body in the clamp cavity area. The plungers displace equal volumes forward and reverse.

The bottom of jaw 51 is pressed against plastic envelope 30 by the clamp so that the plunger heads 58 enter reciprocatory pulse cavities. Rotation of shaft 61 causes diaphragm-like deflections in envelope 30 and produces a pumping action on fluids in the cavities. This action is oscillatory, causing reciprocatory pulsatile flow on the surfaces of the membranes. Because the reciprocatory pulse cavities are integral with the modular assembly of stacked plates and membranes, there is minimal addition to the average hold-up time of the blood being processed and each flow fraction receives uniform treatment.

Figure 8:
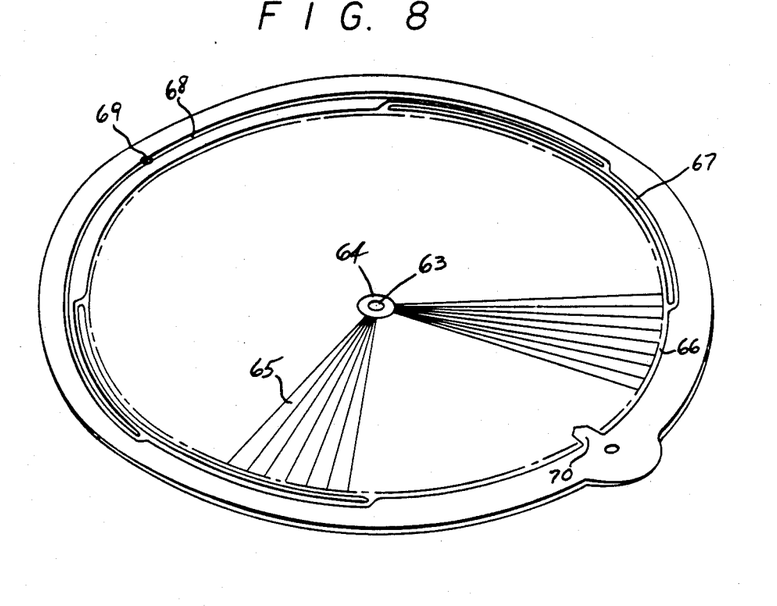
FIG. 8 is a perspective view of an alternative blood side support which may be used in the invention.

FIG. 8 illustrates a second embodiment of the blood pressure balancing and sealing grooves which comprise the improvement of the invention. While the blood side support illustrated is designed for use with the plasma side support of FIG. 9 in the module of FIG. 10, it is clear that FIG. 8 is illustrative only and that the inventive feature can be used in other blood side supports including, for example, the blood side support illustrated in FIG. 2. Referring to FIG. 8, at the center of the plate is blood flow channel inlet 63 surrounded by counterbore 64, which is about 0.5 inch (12.7 mm) in diameter and about 20 mils (0.5 mm) in depth. From the counterbore, radial flow channels 65, shown enlarged and in part, are narrow around the inlet and extend to a perimeter plasma-depleted blood collection channel which is a series of plasma-depleted blood collection channels 66, 67, 68. These channels lead to plasma-depleted blood outlet 69. In the illustration is shown a first perimeter channel 66 which has four equidistant exits to intermediate channels 67 each of which in turn has an exit to final channel 68. Each channel is about 0.070 inch (1.8 mm) wide × 0.030 inch (0.8 mm) deep. These channels comprise the blood pressure balancing and sealing grooves serving in this regard, the same purpose as the perimeter border of short narrow channels 34' in FIG. 2. The channels are spaced inward in region 70 to avoid plasma channels and ports.

Figure 9:
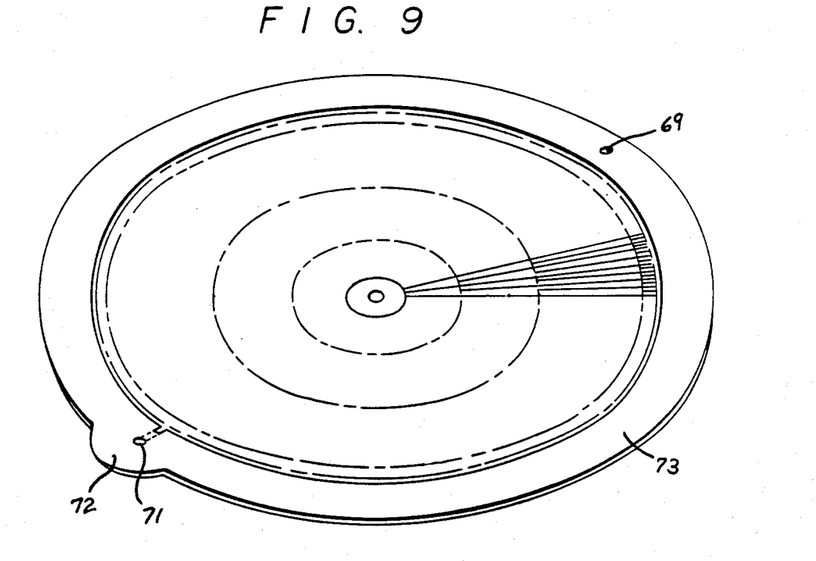
FIG. 9 is a perspective view of a plasma side support which can be used with the blood side support of FIG. 8.

FIG. 9 illustrates a plasma side support which may be used with the blood side support of FIG. 8. It differs from the plasma side support described above in FIG. 3 in the locations of blood outlet 69 and plasma outlet 71, the latter of which is in a protrusion 72 from the edge of the plate in order to avoid the various blood flow channels and ports. Sealing around the inlet is accomplished as illustrated above in FIG. 4. Sealing around the perimeter is effected by a check-valve-like action resulting from pressing a membrane between channels 66, 67, 68 on the blood side support and perimeter sealing surface 73 on the plasma side support, in a manner similar to, though not as effective as, that described above with reference to FIGS. 3 and 4.

Figure 10:
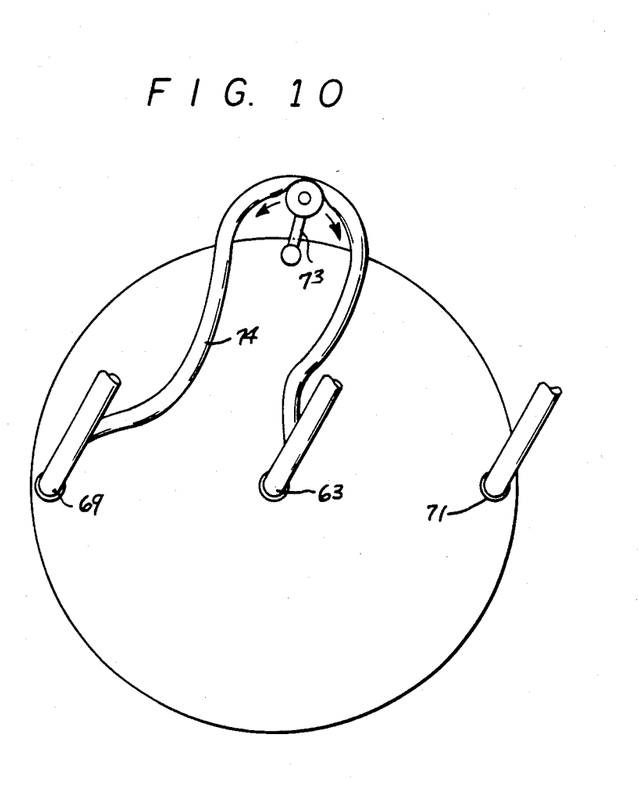
FIG. 10 is a perspective view of a second illustrative embodiment of a module of the invention comprising the supports of FIGS. 8 and 9.

A second illustrative embodiment of a module of the invention employing the blood and plasma side supports of FIGS. 8 and 9 is shown in FIG. 10. This illustrative embodiment is not fitted with reciprocatory pulse cavities. Blood enters the module through blood flow path inlet 63, passes through blood flood flow channels, not shown, in blood side supports, not shown, and exits through plasma-depleted blood outlet 69. Plasma which passes through membranes between plasma and blood side supports flows radially to plasma collection channels and out of the module via plasma outlet 71. An external clamping mechanism, such as the mechanism described above absent the pulse generator, is used to provide structural support.

Reciprocatory pulsations, according to the invention of another inventive entity, are generated by an oscillating peristaltic pump 73 on a loop 74 of flexible tubing extending between blood inlet 63 and plasma-depleted blood outlet 69.

BEST MODE

The best mode for carrying out the invention is illustrated by FIGS. 1 through 7 and the descriptions thereof.

While the preferred embodiments of the invention are illustrated and described above, it is to be understood that the invention is not limited to the precise constructions herein disclosed and that the right to all changes and modifications coming within the scope of the following claims is reserved.

We claim:

1. Improved plasmapheresis filtration module having a planar membrane between a blood side support and a plasma side support, the blood side support having a plurality of blood flow paths extending radially from a central inlet to a plasma-depleted blood channel, wherein the improvement comprises means for blood pressure balancing and membrane sealing at the ends of the blood flow paths on the blood side support, said module further having radial blood flow channels as the blood flow paths on the blood side support and wherein the balancing and sealing means is comprised of a multiplicity of plasma-depleted blood collection channels which lead to a single plasma-depleted blood outlet.

2. Module of claim 1 wherein the multiplicity of plasma-depleted blood collection channels comprises a first perimeter channel which has four equidistant exits to two intermediate perimeter channels each of which in turn has an exit to a final perimeter channel.

3. Module of claim 2 wherein the depth of the radial blood flow channels is about 4 to 10 mils (0.1 to 0.3 mm) and each plasam-depleted blood collection channel is about 0.070 inch (1.8 mm) wide $\times$ 0.030 inch (0.8 mm) deep.

4. Module of claim 1 having radial blood flow channels as the blood flow paths on the blood side support and wherein the balancing and sealing means is comprised of a perimeter border of channels between the radial blood flow channels and a plasma-depleted blood collection channel.

5. Module of claim 4 wherein the channels are each about 4 to 30 mils (0.1 to 0.3 mm) wide.

* * * * *